United States Patent [19]

Carlsen

[11] 4,062,104
[45] Dec. 13, 1977

[54] DISPOSABLE CLINICAL THERMOMETER PROBE

[76] Inventor: Walter Norman Carlsen, 892 Mango Ave., Sunnyvale, Calif. 94087

[21] Appl. No.: 758,561

[22] Filed: Jan. 12, 1977

Related U.S. Application Data

[63] Continuation-in-part of Ser. No. 610,860, Sept. 5, 1975, abandoned.

[51] Int. Cl.² .................. H01S 4/00; B21D 22/00; H01V 1/02
[52] U.S. Cl. .................. 29/592 R; 136/230; 136/232; 73/359 R; 427/2; 427/250; 427/251
[58] Field of Search .................. 73/359; 29/573, 592; 136/230, 232; 427/2, 250, 251

[56] References Cited
U.S. PATENT DOCUMENTS 3,099,576   7/1963   Hill .................. 136/230

Primary Examiner—Ronald H. Smith
Assistant Examiner—S. Silverberg

[57] ABSTRACT

A disposable thermocouple probe to be used in association with an electronic processing and indicating device to comprise a clinical thermometer. The dissimilar metals of the thermocouple junction are applied by the vacuum deposition process. The optical nature of the process allows the metal thickness to be graduated to allow the dissimilar metals at the junction to be only .0001 to .1 mils thick to allow response times of less than one second, while the metal which makes sliding contact with the processing and display portion of the thermometer is graduated to a thickness of 10 times greater, for example, than the metal thickness at the junction to resist the abrasion encountered when inserted at time of use. A method is provided for the handling of the probes in large quantities by molding a structure which resembles a comb in which the individual probes are supported by a backbone. The probes are handled in this large comb configuration through the entire process till they are finally stripped from the backbone into sterile containers.

8 Claims, 4 Drawing Figures

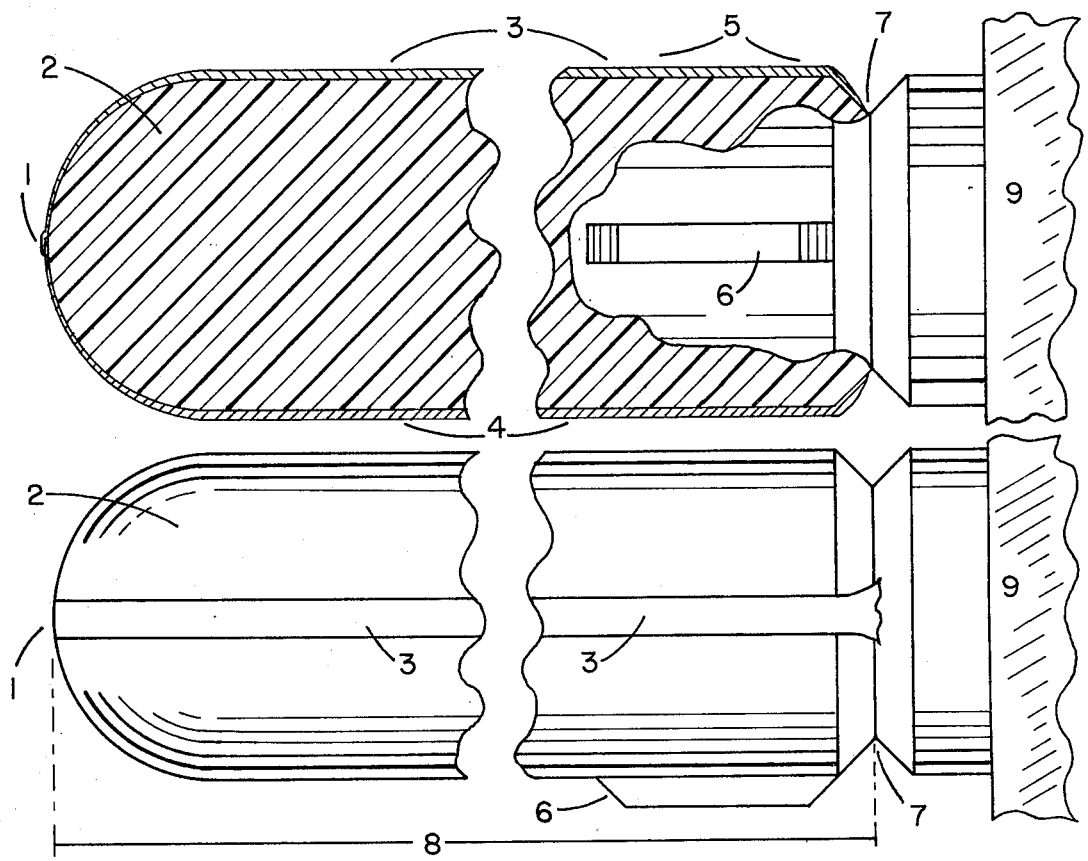
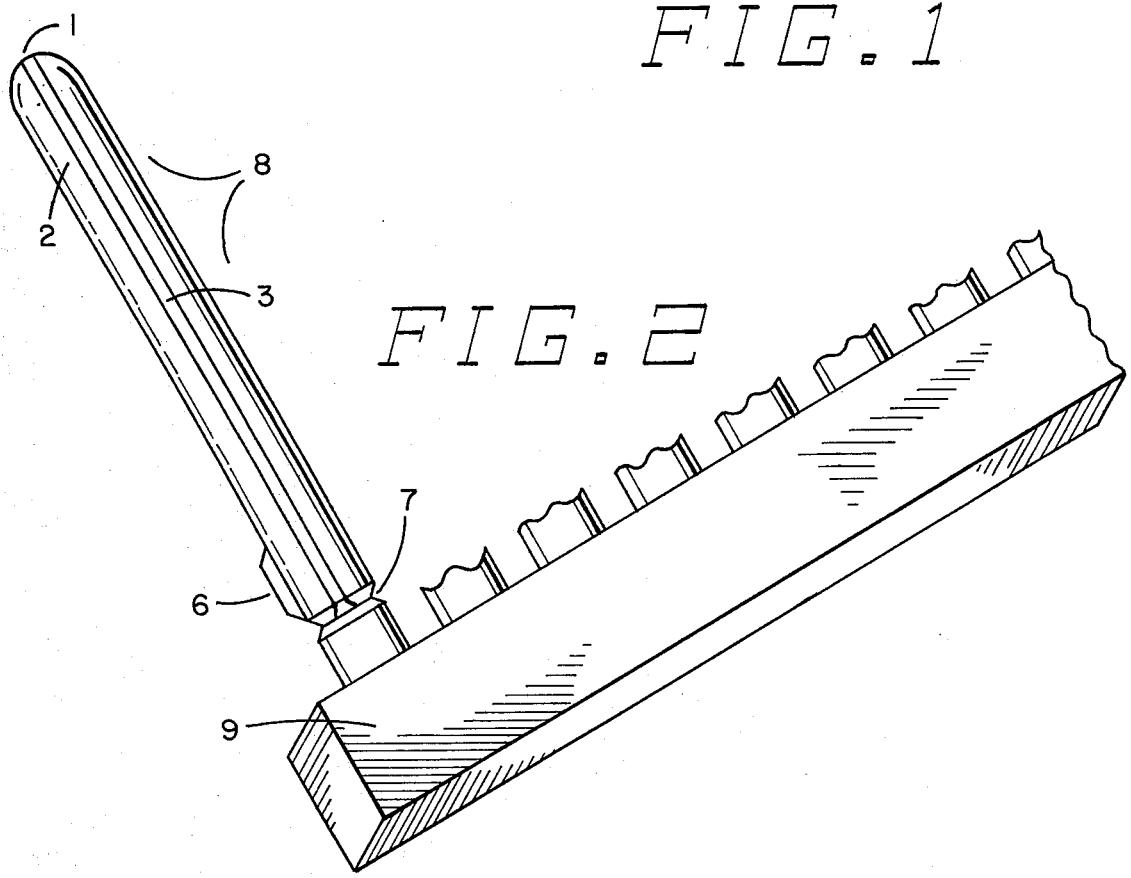

DISPOSABLE CLINICAL THERMOMETER PROBE

This is a continuation-in-part of application Ser. No. 610,860 filed 9/05/75, now abandoned.

BACKGROUND OF THE INVENTION

1. Field of the Invention

This invention relates to thermometers for the measurement of human body temperature, and specifically to disposable types.

2. Description of the Prior Art

Patients in hospitals and other health care environments routinely have their temperatures taken as a diagnostic procedure. The number of temperatures taken per year, in the United States alone, number approximately 3 billion. This need, in the past, has been served by the Mercury Thermometer and, to some extent, more recently by Electronic Thermometers with both disposable and non-disposable probes.

All thermometers require sterilization after each use, or that a portion of the device which contacts the patient be disposable.

Mercury thermometers are too expensive for disposal after each use and require sterilization. The alcohol dip sterilization, which has been used in the past, is relatively convenient but has proven to be inadequate and results in patient cross-contamination. Other methods are time consuming and expensive. The mercury thermometer has a very long 3 minute response time which results in an inefficient nurse-administration pattern. The mercury thermometer is, in addition, fragile and hazardous should the component parts be ingested. The electronic thermometer with disposable probes overcomes the problem of cross-contamination and represents a significant step forward. The main limitation to this time has been the response time. Although faster than the mercury type, typical examples are 20 seconds or greater. Because of the bulk of the measuring device, the nurse is required to hold the probe in the patients mouth or immediately supervise its use, and therefore results in no improvement in the nurse-utilization procedure. The slowness of the disposable electronic types result because of the basic implementation of the device. The temperature-sensitive portion of the probe (a Thermistor, Thermocouple, or other heat-sensitive element) is too expensive to discard with each use and is therefore shrouded with a disposable cover. The covers are either a thin plastic which is a relatively poor conductor of heat, or a thicker plastic with a thermally conductive metal insert which exhibits a large thermal mass. Either of these types results in response times of 20 seconds or greater.

SUMMARY OF THE INVENTION

The invention provides a disposable thermometer probe exhibiting a response time of about 1 second or less, and eliminating the patient contamination of non-disposable type thermometers. The short response time allows a better utilization of the nurses time and adds to the patients comfort.

The primary object of the invention is to provide a clinical thermometer probe which can be fabricated inexpensively and thereby be disposable after usage, and indicates the patients temperature within approximately 1 second to bring efficiency to this phase of health care.

BRIEF DESCRIPTION OF THE DRAWING

FIG. 1 is an enlarged view of a preferred embodiment of the thermocouple probe.

FIG. 2 is a perspective view of a preferred embodiment of the comb probe structure.

DESCRIPTION OF THE PREFERRED EMBODIMENTS

Figure 4:
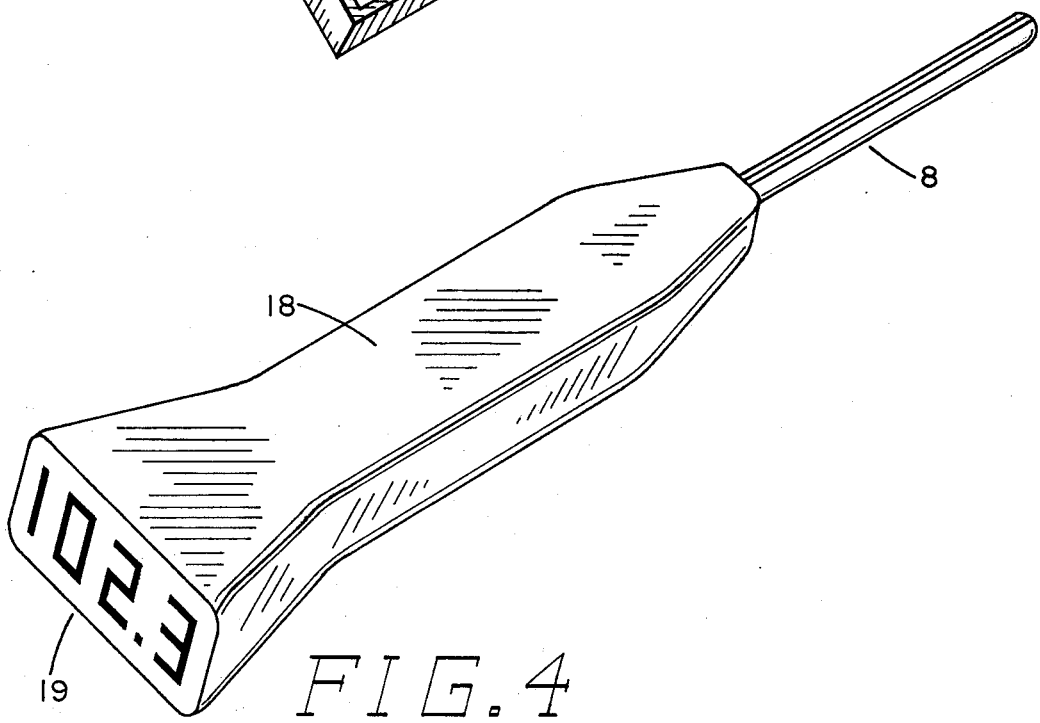
FIG. 4 is a perspective view of a clinical thermometer employing the thermocouple probe.

Referring to FIG. 1 there is shown a thermocouple thermometer probe in which its dissimilar metals 3 and 4 are disposed in thin strips along the plastic probe substrate 2 by the vacuum deposition process, and overlap at 1 to form a thermocouple junction. The probe substrate is cylindrical with a rounded nose, and a diameter of ⅛ inch to ½ inch being representative. Various combinations of metals are used in the formation of conventional welded, soldered, or mechanically formed thermocouple junctions. Some examples are: Iron vs. copper-nickel, nickel-chromium vs. nickel-aluminum, nickel-chromium vs. copper-nickel, copper vs. copper-nickel, platinum vs. platinum and rhodium. The thermocouple junction generates a voltage varying in proportion to the patients temperature which is processed and converted to a signal to be applied to a display allowing the patients temperature to be read by the operator. FIG. 4 is a preferred embodiment of a clinical thermometer employing the thermocouple probe 8. The body section 18, which is held by the operator while taking a temperature, houses the electronic processing circuitry. The digital display 19 indicates the patients temperature.

The thermocouple probe 8 when finished extends to the parting line 7 and includes a locating key 6 which assures the proper electrical polarity from the thermocouple junction.

The thickness of each of the dissimilar metals at the thermocouple junction 1 disposed at the nose of the probe, with the vacuum deposition process, may easily range from 0.0001 mils to 1 mil. The response time for these thicknesses would range from less than one second to approximately one second. The response time of probes with metal thickness less than 0.5 mils is less than one second and is predominately determined by the heat capacity and heat flow characteristics of the substrate.

A method for making the thermocouple probe in large quantities is described in this preferred embodiment although the probe may be made in smaller quantities with simpler machines and assemblies.

Figure 3:
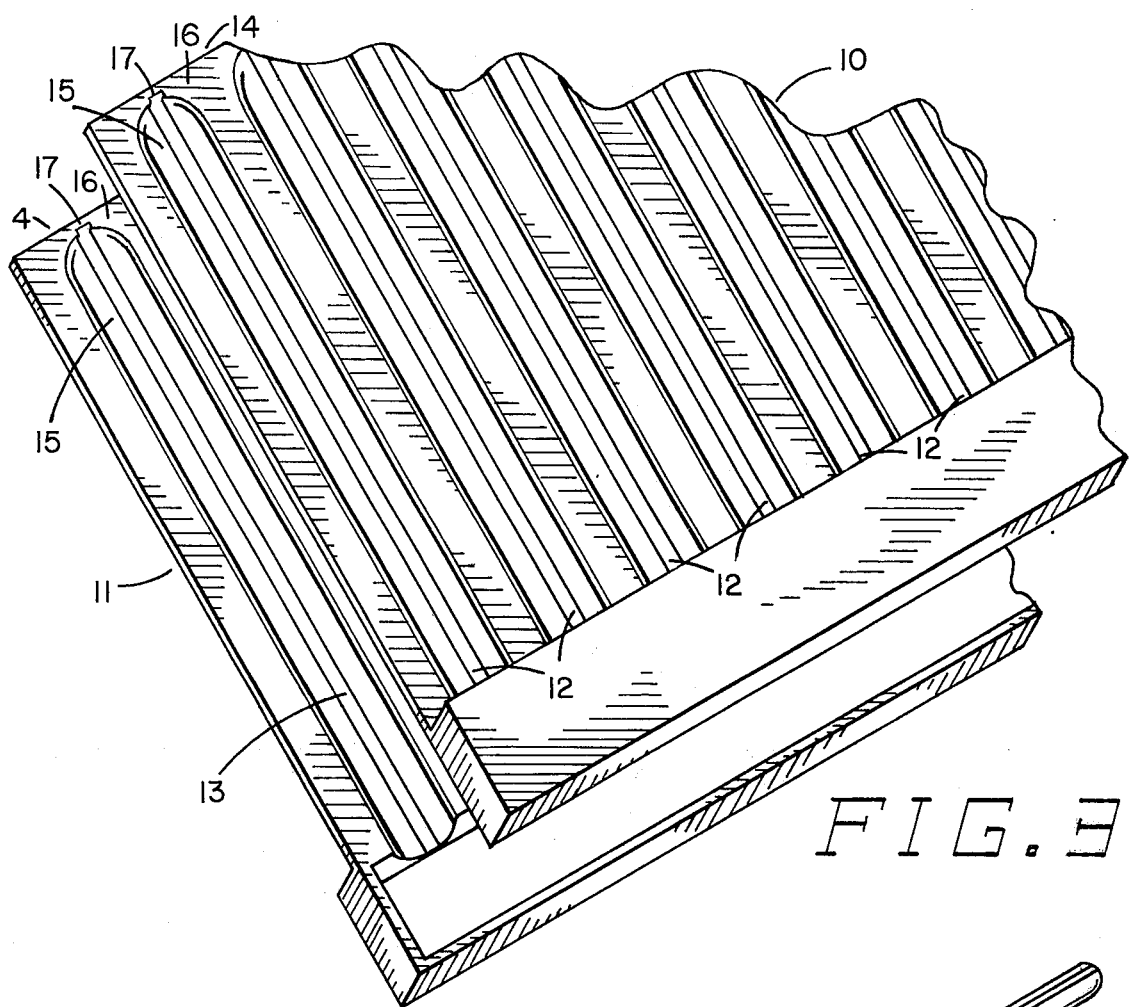
FIG. 3 is a perspective view of a preferred embodiment of the mask assembly.

A comb probe structure shown in FIG. 2 is formed, for example, by injection molding. The structure has numerous individual probe substrates 2 disposed along the supporting backbone 9. Each individual probe includes a locating key 6 and at the completion of the process will terminate in length at the parting line 7. The comb probe structure is so formed to allow handling of large numbers of probes at one time, and to allow accurate alignment with a mask assembly shown in FIG. 3.

The mask assembly is comprised of two halves 10 and 11 which may be formed, for example, from injection molded plastic or stainless steel sheet material, and when assembled together have an interior shape which matches the exterior shape of the comb probe structure.

A longitudinal slot 12 in the top half and 13 in the bottom half extend the length of the cylindrical portion with a width, for example, of 50 mils. The mask halves are disposed around the comb probe structure to form a single rigid probe/mask assembly. The slots shield the portion of the probe substrate which is not to be coated with the metal deposit during the vacuum deposition process. In the vacuum deposition process the machine is typically evacuated to $10^{-4}$ to $10^{-7}$ Torr for evaporation types or to $10^{-2}$ to $10^{-4}$ Torr of Ionized gas in sputtering types. The metal source is then heated by resistance, induction, or electron beam in the evaporation type or bombarded by ions in the sputtering type. The resulting vaporized metal (in the clasical process) leaves the source with density and direction defined by the cosine law. In a perfect vacuum the metal vapor encounters the target with it's original velocity and direction, without any interactions. When the vaporized metal encounters a target (the probe, a mask, or the deposition machine's chamber wall) it is totally deposited (condensed) on that surface. Since the metal travels in a straight line away from the target (as "seen" from the target position) the path is often referred to as "line of sight". The actual process never totally achieves the above perfection, even if desired, and very often a small quantity of inert gas is introduced as a process refinement to achieve some scattering. Since the path the resulting vaporized metal follows in this process is analogous to the line of sight transmission of light, the mask assembly is required to only "shade" those portions that are not desired to be covered. A single thin strip of metal is disposed on one half of the probe substrate at a time by the proper positioning of the metal vapor source with respect to longitudinal slot 12 or 13. The position is such that all parts of the probe substrate other than the thin strip on one side and extending somewhat beyond the centerline of the nose are "shaded" by the mask. The line of sight transmission when coupled with the proper orientation of the comb probe structure with respect to the metal vapor source allows the thickness of the metal strip to be graduated, with the thickness at the thermocouple junction 1 to be 1/10 that of the rear mounting portion 5. This allows the thermocouple junction 1 to be, for example, 0.1 mils resulting in less than one second settling times while the rear mounting portion 5 may be, for example 0.1 mils to resist the abrasion resulting when the probe is inserted at time of use. This thickness graduation, while highly desirable, is not imperative to the probes function.

The amount of overlap of the dissimilar metals 3 and 4 at the Thermocouple junction 1 is, for example, 25 mils. The overlap may be controlled during the vacuum deposition process by disposing an additional masking strip in the nose area 14 of the mask assembly of FIG. 3 but is not utilized or shown in this preferred embodiment. The overlap is controlled in the preferred embodiment by again utilizing the line of sight travel characteristic of the vaporized metal. The longitudinal slots 12 and 13 extend beyond the cylindrical portion 15 into the flat portion 16, 10 mils for example. The slot detail 17 of slots 12 and 13 in the flat portion of the mask assembly coupled with the orientation of the probe substrate and mask assembly with respect to the vaporized metal source allows the "shadow" of the mask assembly to fall somewhat past the centerline of the probe nose area for each of the metals and allows them to overlap each other. The amount of overlap is controlled by the orientation of the mask assembly and length of the slot detail 17.

The orientation of the vaporized metal source with respect to the mask assembly is then different for each metal. The change of orientation is accomplished by rotation of the composite probe/mask assembly within the machine or positioning each of the metal sources such that when they are active, their orientation is correct with respect to the fixed mask assembly.

After disposing the dissimilar metals 3 and 4 by vacuum deposition the mask assembly halves 10 and 11 are removed from the comb probe structure of FIG. 2. The heat of the prior injection molding of the comb probe structure and subsequent vacuum deposition process has resulted in sterilization of the comb probe structure. The remaining step of the process is to fracture the probe portion 8 of the structure along the parting line 7 into individual sterile containers and seal them.

While the preferred embodiments of the invention have been described, it will be understood that somewhat different machines, dimensions, or procedures might be employed by people skilled in the art without departing from the spirit and scope of the invention as set forth in the appended claims.

I claim:

1. A method of making a disposable clinical thermocouple probe comprised of:
    forming a large plastic comb probe structure,
    forming a large mask assembly,
    disposing the mask assembly around the comb probe structure,
    positioning the probe/mask assembly in a vacuum deposition process machine with its orientation in relation to a first metal vapor source defined by the line of sight nature of the vacuum deposition process,
    energizing a first metal vapor source and despositing a first thin strip of metal with a thickness from .0001 mils to about 1 mil,
    energizing a second metal vapor source which is dissimilar to the first metal vapor source and whose orientation in relation to the probe/mask assembly is defined by the line of sight nature of the vacuum deposition process,
    depositing a second thin strip of dissimilar metal overlapping the first thin strip of metal at the nose of the cylindrical substrate and with a thickness from 0.0001 mils to about 1 mil,
    removing the mask assembly from the comb probe structure, fracturing the probes from the backbone of the comb probe structure at their individual parting lines into multiple sterile containers,
    sealing the sterile containers.

2. The method of claim 1 and including:
    rotating the probe/mask assembly after depositing the first thin metal strip to a new orientation in relation to the second dissimilar metal vapor source and defined by the line of sight nature of the vacuum deposition process.

3. A method of making a disposable thermocouple probe comprised of:
    forming a number of plastic probe substrates,
    disposing a mask assembly around the probe substrates,
    positioning the probe/mask assembly in a vacuum deposition process machine with its orientation in relation to a first metal vapor source defined by the line of sight nature of the vacuum deposition process, energizing a first metal vapor source and depositing a first thin strip of metal with a thickness from 0.0001 mils to about 1 mil, energizing a second metal vapor source which is dissimilar to the first metal vapor source and whose orientation in relation to the probe/mask assembly is defined by the line of sight nature of the vacuum deposition process, depositing a second thin strip of dissimilar metal overlapping the first thin strip of metal at the nose of the cylindrical substrate and with a thickness from 0.0001 mils to about 1 mil, removing the mask assembly from the probes, placing the probes in sterile containers, sealing the sterile containers.

4. The method of claim 3 and including:

rotating the probe/mask assembly after depositing the first thin metal strip to a new orientation in relation to the second dissimilar metal vapor source and defined by the line of sight nature of the vacuum deposition process.

5. The method of claim 1 and including:

energizing a first metal vapor source and depositing a first thin strip of metal with a thickness graduated from about 0.0001 mils to about 0.1 mil at the probe nose to a thickness of about 10 times greater than the nose thickness at the probes rear mounting portion, depositing a second thin strip of dissimilar metal overlapping the first thin strip of metal at the nose of the cylindrical substrate and with a thickness graduated from about 0.0001 mils to about 0.1 mil at the probes nose to a thickness of about 10 times greater than the nose thickness at the probes rear mounting portion.

6. The method of claim 2 and including:

energizing a first metal vapor source and depositing a first thin strip of metal with a thickness graduated from about 0.0001 mils to about 0.1 mil at the probe nose to a thickness of about 10 times greater than the nose thickness at the probes rear mounting portion, depositing a second thin strip of dissimilar metal overlapping the first thin strip of metal at the nose of the cylindrical substrate and with a thickness graduated from about 0.0001 mils to about 0.1 mil at the probes nose to a thickness of about 10 times greater than the nose thickness at the probes rear mounting portion.

7. The method of claim 3 and including:

energizing a first metal vapor source and depositing a first thin strip of metal with a thickness graduated from about 0.0001 mils to about 0.1 mil at the probe nose to a thickness of about 10 times greater than the nose thickness at the probes rear mounting portion, depositing a second thin strip of dissimilar metal overlapping the first thin strip of metal at the nose of the cylindrical substrate and with a thickness graduated from about 0.0001 mils to about 0.1 mil at the probes nose to a thickness of about 10 times greater than the nose thickness at the probes rear mounting portion.

8. The method of claim 4 and including:

energizing a first metal vapor source and depositing a first thin strip of metal with a thickness graduated from about 0.0001 mils to about 0.1 mil at the probe nose to a thickness of about 10 times greater than the nose thickness at the probes rear mounting portion, depositing a second thin strip of dissimilar metal overlapping the first thin strip of metal at the nose of the cylindrical substrate and with a thickness graduated from about 0.0001 mils to about 0.1 mil at the probes nose to a thickness of about 10 times greater than the nose thickness at the probes rear mounting portion.

* * * * *